United States Patent [19]

Wallace

[11] Patent Number: 4,471,663
[45] Date of Patent: Sep. 18, 1984

[54] DRILLING TORQUEMETER

[75] Inventor: Laverne F. Wallace, Marion, Mass.

[73] Assignee: Exxon Production Research Co., Houston, Tex.

[21] Appl. No.: 367,449

[22] Filed: Apr. 12, 1982

[51] Int. Cl.³ .............................................. G01L 3/14
[52] U.S. Cl. ................................................ 73/862.35
[58] Field of Search ......................... 73/862.33, 862.35

[56] References Cited

U.S. PATENT DOCUMENTS

| | | | |
|---|---|---|---|
| 3,664,184 | 5/1972 | Dyer | 73/862.35 X |
| 3,728,896 | 4/1973 | Sheldon et al. | 73/862.35 |
| 3,876,972 | 4/1975 | Garrett | 73/862.33 X |
| 3,956,930 | 5/1976 | Shoberg | 73/862.35 X |

*Primary Examiner*—Charles A. Ruehl
*Attorney, Agent, or Firm*—Kenneth C. Johnson

[57] ABSTRACT

The present invention is a torquemeter for measuring the torque applied during drilling operations. The torquemeter is of generally flat annular form and adapted to be positioned in the drive train around a Kelly and between the rotary table and the Kelly bushing and to rotate therewith. The torquemeter includes an annular torque link receiving forces from the rotary table whereby torque is transmitted from the rotary table to the torque link. The torque link has a set of bearing areas for receiving azimuthal forces from the Kelly bushing whereby torque is transmitted from the torque link to the Kelly bushing. Each of the bearing regions is mechanically isolated from the remainder of the torque link except for radially oriented bridging beams which support the isolated regions and serve as the sole conduits for transfer of mechanical forces from the isolated region to the remainder of the torque link. Each of the bridging beams has coupled thereto associated strain measuring means responsive to the shear stress in the associated beam, and providing an indication thereof. The torquemeter includes means for transmitting to a stationary control station signals derived from the strain measuring means and indicative of the torque transferred from the rotary table to the Kelly bushing by the torque link.

10 Claims, 9 Drawing Figures

DRILLING TORQUEMETER

BACKGROUND OF THE INVENTION

This invention relates to measuring the torque applied to the drill string during operation of drilling rigs, especially rigs used for oil well drilling.

It has been increasingly realized that it is desirable to measure the torque applied to the drill string during drilling operations. The measured torque may be used in various ways to control and optimize the drilling operations.

SUMMARY OF THE INVENTION

The invention features a torquemeter for measuring the torque applied during drilling operations by a drilling rig having a drive train including a rotary table, a Kelly bushing and a Kelly. The torquemeter is of generally flat annular form and adapted to be positioned in the drive train around the Kelly and between the rotary table and the Kelly bushing and to rotate therewith. The torquemeter includes an annular torque link having a first set of a plurality of bearing regions for receiving forces azimuthal with respect to the drilling axis from the rotary table whereby torque is transmitted from the rotary table to the torque link and a second set of a plurality of bearing areas displaced azimuthally from the first set for receiving azimuthal forces from the Kelly bushing whereby torque is transmitted from the torque link to the Kelly bushing. Each of the bearing regions of at least one of the sets is mechanically isolated from the remainder of the torque link except for bridging beams which support the isolated regions and serve as the sole conduits for transfer of mechanical forces from the isolated region to the remainder of the torque link. Each of the bridging beams has coupled thereto associated strain measuring means responsive to the state of stress in the associated beam, and providing an indication thereof. The torquemeter includes means for transmitting to a stationary control station signals derived from the strain measuring means and indicative of the torque transferred from the rotary table to the Kelly bushing by the torque link.

The invention may additionally feature a torque link having generally flat upper and lower surfaces, the torque link having cavities with electrical equipment and connections used in effecting operation of the strain measuring means affixed therein, the cavities being arranged so that the electrical equipment is accessible from the upper and lower faces while lying wholly between the upper and lower faces, and the apparatus may include flat upper and lower covers fitting against the upper and lower faces respectively and removably attached to the torque link at points not in the isolated regions, and sealing means whereby the covers seal off the cavities to prevent entry of dirt associated with drilling operations. The torquemeter may also include an antenna for data transmission affixed on the torque link outward from its periphery and within the flat upper and lower faces, the covers extending outward from the torque link to protect the antenna and two bridging beams supporting each isolated region, the first thereof extending radially inward from the region and the second extending radially outward from the region, the beams being positioned and dimensioned so that they lie between and spaced from the covers, a pair of strain gages being affixed to each of the beams on faces facing the covers and oriented and connected so as to give an indication of the shear strain in the beam. A torquemeter according to the invention may have the flat faces of the isolated regions facing the covers depressed slightly below the level of the flat faces of the remainder of the torque link so that the flat faces of the isolated regions will engage and seal against the opposed cover but will not transmit mechanical forces to the opposed cover. A torquemeter according to the invention may have apertures adapted for receiving pins affixed to the Kelly bushing, and other bearing regions not isolated, include pins protruding therefrom for engagement with the rotary table, and the apertures may be lined with a wear bushing of harder material than the main structure of the torque link, and the surface of the aperture may be contoured so that the pin of the Kelly bushing when inserted bears at the medial plane of the torque link, and the torquemeter may have composite structure, the torque link being made of aluminum while the covers are made of steel to achieve a light structure resistant to abrasion from the Kelly bushing.

DESCRIPTION OF THE EMBODIMENT

Figure 1:
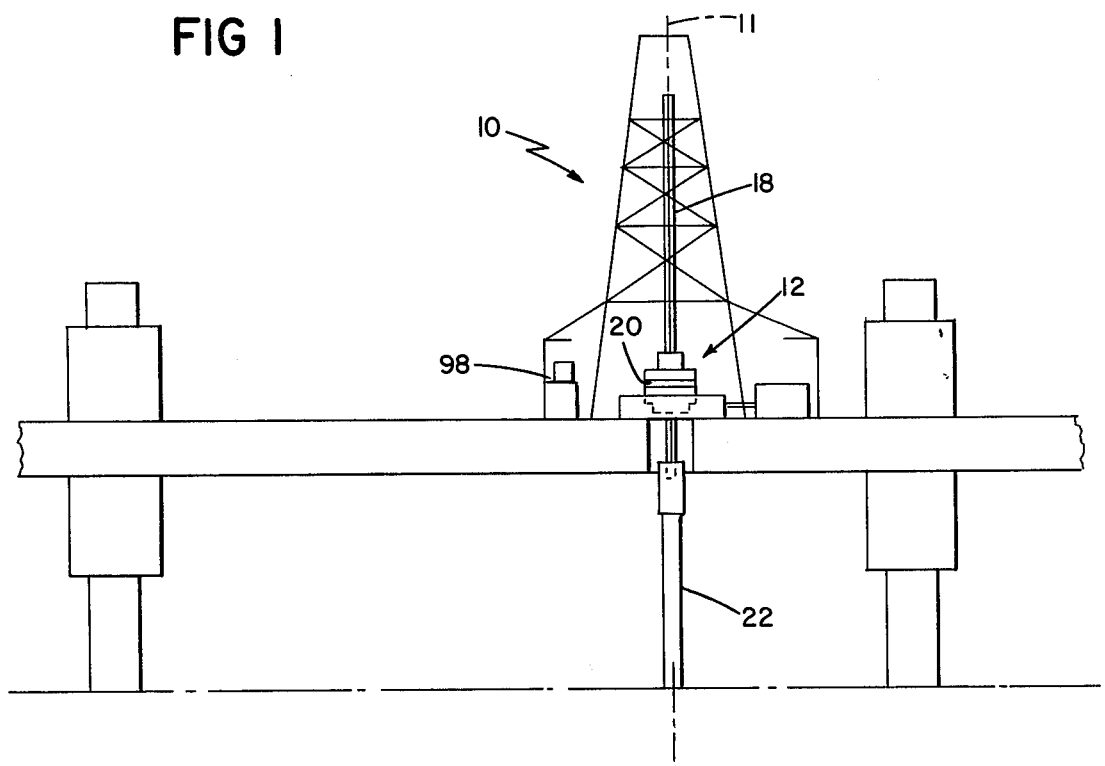
FIG. 1 shows a drilling rig employing a torquemeter according to the invention.
Figure 2:
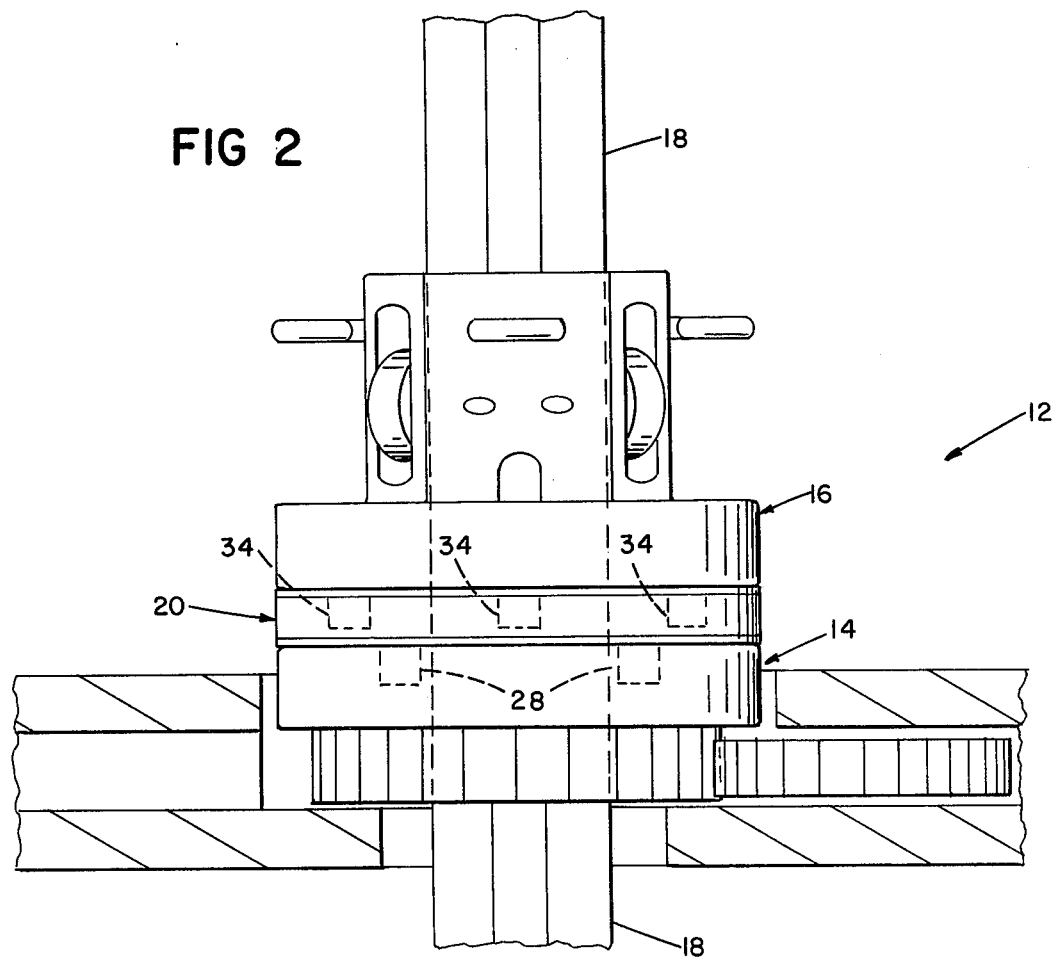
FIG. 2 shows a portion of the drive train of the drilling rig of FIG. 1 with a torquemeter according to the invention installed therein.
Figure 3:
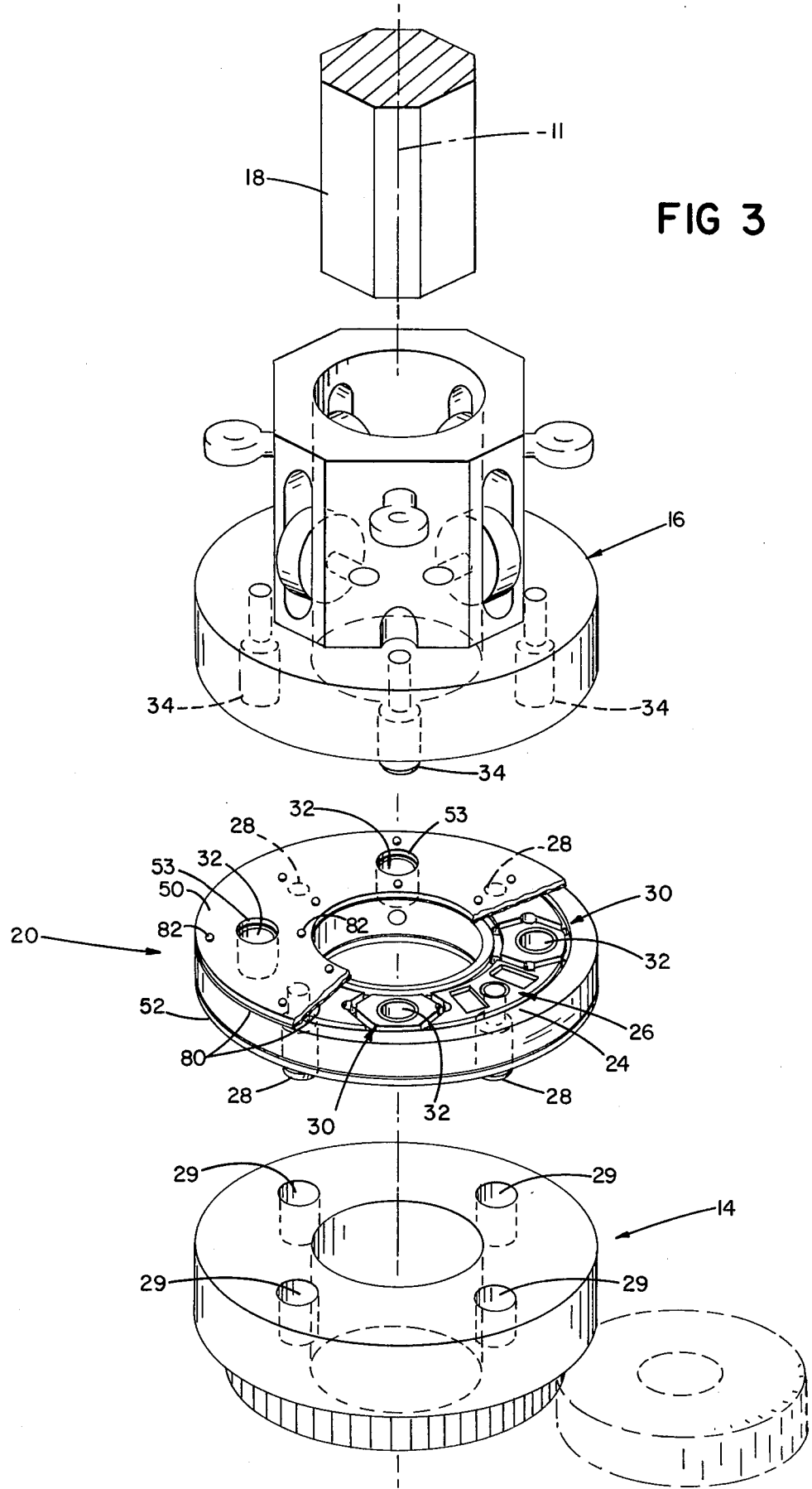
FIG. 3 shows in perspective an exploded view of the drive train of FIG. 2, some portions of the torquemeter being broken away to reveal interior details.
Figure 4:
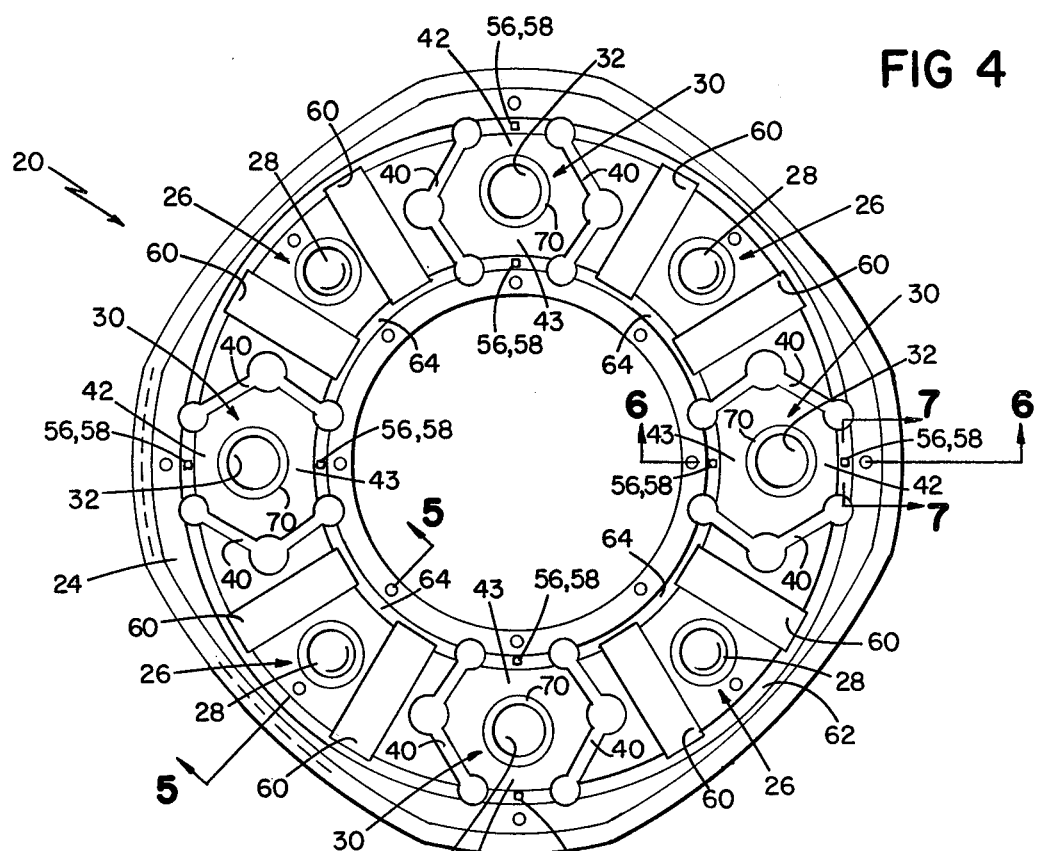
FIG. 4 shows a plan view of the torquemeter of FIG. 2 with cover removed.
Figure 5:
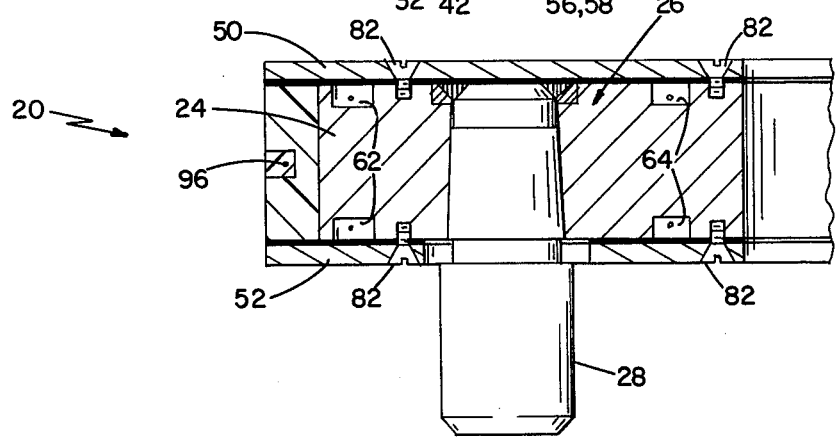
FIG. 5 shows a partial cross-section of the torquemeter taken on the plane 5—5 of FIG. 4.

An oil well drilling rig 10 with drilling axis 11 as shown in FIG. 1 has a drive train 12 which includes rotary table 14, Kelly bushing 16, and Kelly 18. Torquemeter 20 according to the invention has a generally flat, annular form and is adapted to be positioned in the drive train between the rotary table 14 and Kelly bushing 16 and rotate therewith while fitting around the Kelly which supports the lower portion of the drill string 22.

Torquemeter 20 includes aluminum torque link 24 which has a set of 4 bearing regions 26 in which pins 28 are affixed. Pins 28 enter corresponding holes 29 in rotary table 14. Torque link 24 has a second set of 4 bearing regions 30 in which apertures 32 are set. Pins 34, affixed to Kelly bushing 16 enter into apertures 32 of torque link 24. The size and spacing of pins 28 are the same as pins 34, and the size and spacing of apertures 32 are the same as holes 29 so that torquemeter 20 can be inserted in drive train 12 without modifying the drive train. Wear bushings 70, made of steel and having blind bottoms are fitted into regions 30 of torque link 24 to receive pins 34 Bushings 70 are contoured to have a slightly smaller interior diameter at the median plane 72 so that the forces between the bushing and the pin will be applied at the median plane of torque link 24.

Figure 7:
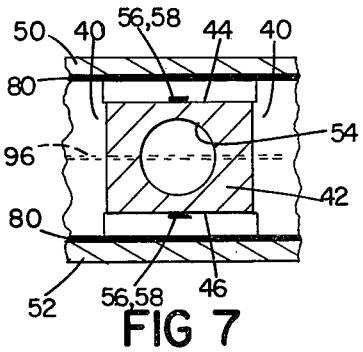
FIG. 7 shows a partial cross-section of the torquemeter taken on the plane 7—7 of FIG. 4.
Figure 8:
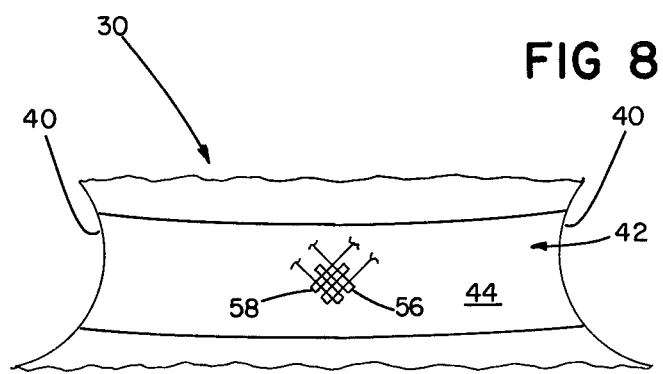
FIG. 8 shows a detail of the torquemeter of FIG. 2.

Isolating cuts 40 are situated around each of bearing regions 30 so that each region 30 is isolated mechanically from the remainder of the torque link except for bridging beams 43 which extend radially inward and bridging beams 42 which extend outward from regions 30 and provide the sole support for region 30 in torque link 24. Beams 42, as shown particularly in FIG. 7, have rectangular overall cross-section with faces 44 and 46 lying perpendicular to the axis 11 of the drill string and facing covers 50, 52 are recessed so as to be spaced from covers 50, 52. Holes 54 pass through beams 42 in a direction longitudinal with respect to the beams (radially with respect to the drilling axis) serving to reduce the cross-sectional area of the beams and thereby increase the stress loading on the cross-section with little loss of stiffness. Paired strain gages 56, 58 are affixed to face 44 of beam 42, the gages being oriented at right angles to each other and at 45 deg. from the axis of the beam. Similar strain gage pairs are affixed to lower face 46 of beam 42. The configuration of inward extending beam 43 and the installation of gages thereon are essentially the same as described for beam 42, and the beams and gages are replicated for all four isolated regions 30. There are thus 32 strain gages in all. Torque link 24 has formed therein outer channel 62, inner channel 64 and several cavities 60. Electrical equipment 66 for operating the strain gages and for data transmission are installed in cavities 60, and communications lines pass in chemicals 62 and 64.

Flat upper cover 50 and lower cover 52 each made of steel are removably attached to torque link 24 with elastomeric sheets 80 between each cover and the torque link to provide a seal between the covers and the flat faces of torque link 24. Cover 50 is attached by screws 82 which are positioned to avoid isolated bearing regions 30. Holes 53 in cover 50 are positioned above corresponding apertures 32 in isolated region 30 to admit pins 34 and are somewhat larger than apertures 30 so that when pins 34 are inserted Kelly bushing 16 does not touch cover 50. The surfaces of isolated bearing regions 30 facing covers 50 and 52 are depressed about 0.005 inch below the general level of the surface of torque link 24 so that while making a sealing contact with elastomeric sheets 80 they will not be coupled mechanically by frictional forces to the opposed cover.

Figure 9:
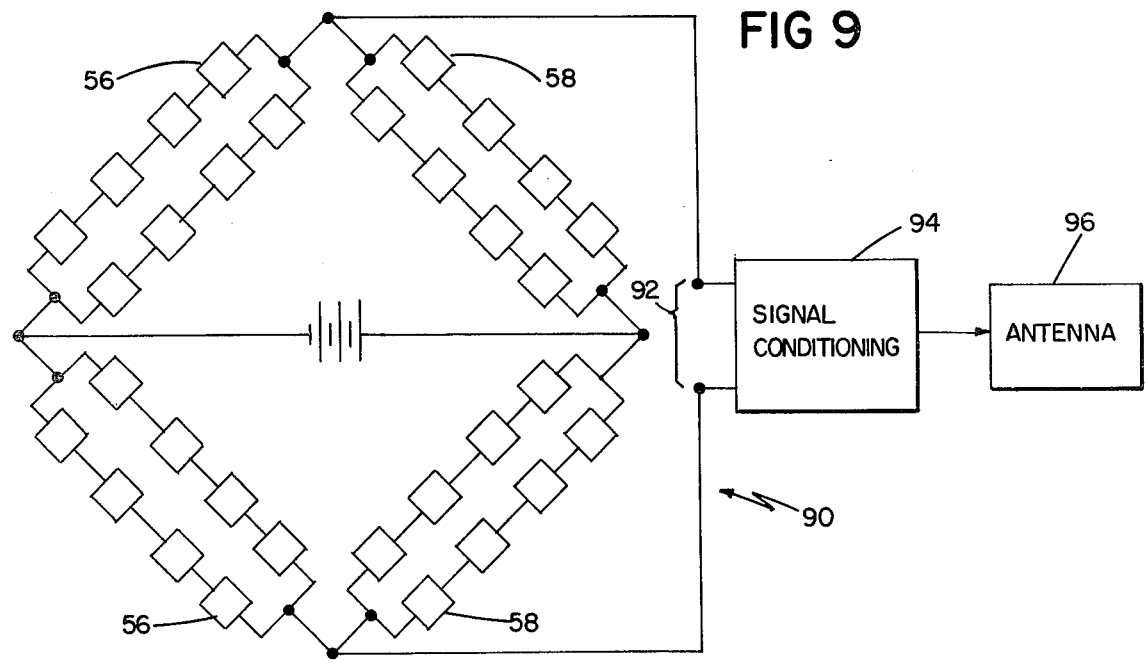
FIG. 9 shows a schematic wiring diagram of electrical equipment used in the torquemeter of FIG. 2.

The strain gages are connected in a bridge circuit 90 as shown in FIG. 9. It should be noted that the two gages of a pair affixed at a given station such as gages 56 and 58 are connected into opposing legs of the bridge circuit. Because of the orientation of the paired strain gages and the connection of the paired elements into opposing legs of the bridge circuit, the composite signal from each pair of gages contributes a component to the output signal at 92 representative of the shear strain at the beam where the gage pair is affixed. Using well known theory of mechanics the shear strain can be interpreted as a shear stress in the associated beam and, taking account of the radial orientation of the beams, as the torque transferred through the beam. The output 92 of the bridge circuit is thus indicative of the aggregate torque transferred through all the bridge beams 42 and 43. The output 92 of bridge circuit is connected to signal conditioning equipment 94 in cavities 60 where it is converted with conventional, commercially available equipment to a form suitable for radio transmission. The output from signal conditioning equipment 94 is connected to antenna system 96, which is installed around the periphery of torque link 24 and between covers 50 and 52. A signal indicative of the torque carried by torque link 24 is radiated from antenna to stationary control station 98 where the signal is further processed and used to display or control functions as desired.

Figure 6:
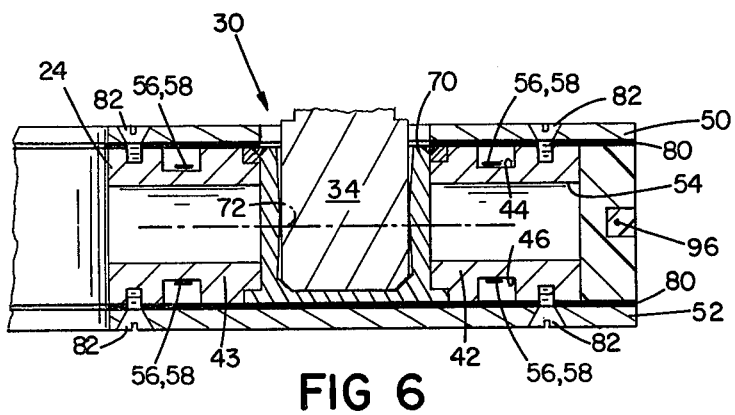
FIG. 6 shows a partial cross-section of the torquemeter takes on the plane 6—6 of FIG. 4.

In operation, the torquemeter is installed in a drilling drive train simply by inserting it between the Kelly bushing and the rotary table. The protuding pins of the torquemeter fit into the holes in the rotary table vacated by the Kelly bushing, and the apertures of the torquemeter receive the pins of the Kelly bushing, which bottom in wear bushing 70, as shown in FIG. 6. When the drill drive is put in operation, rotary table applies drive forces through pins 28 to regions 26 of torque link 24. These forces are transferred through the structure of link 24 to bridge beams 42 and 43 and then through these beams to isolated bearing regions 30. From isolated regions 30 the drive forces are transferred through pins 34 to the Kelly bushing 16 and thence ultimately to the drill string. All the torque producing forces of the drive train thus flow through beams 42 and 43. The stresses in beams 42 and 43 produce strains therein and in particular the torque producing stresses induce shear strains in the beams. The affixed crossed pairs of strain gages on each beam are connected in opposing legs of bridge 90 so that the net output of each crossed pair is a measure of the shear strain in the associated beam. In accordance with well known principles of mechanics the shear strains of beams can be interpreted as shear stresses and the aggregate of shear stresses in all the beams as the total torque transferred through the beams. The outputs of all the crossed pairs of gages is effectively added in the bridge circuit producing an output signal indicating the total torque transmitted through the torquemeter. This signal is then transmitted by a radio link to the control station for use as desired.

The embodiment of the invention described above advantageously employs a structural configuration confining the torque producing stresses to well defined paths which are susceptible to measurement. The Kelly bushing and its attached pins are prevented from contacting anything but the isolated regions of the torque link so that no torque can be transmitted through the upper cover. The use of a composite structure with a light-weight aluminum inner structure and harder steel covers and wear bushings for receiving the Kelly bushing pins advantageously reduces the overall weight of the torquemeter to permit transportation by helicopter while providing abrasion and wear resistance where needed, and further protects the electrical elements and cicuitry while making them accessible for maintenance or modification. The overall unit according to the invention provides a torquemeter that advantageously can be inserted into an existing drilling rig without requiring modification of the rig.

What is claimed is:

1. A torquemeter for measuring the torque applied during drilling operations by a drilling rig having a drive train including a rotary table, a Kelly bushing and a Kelly, said torquemeter being of generally flat annular form and adapted to be positioned in the drive train around the Kelly and between the rotary table and the Kelly bushing and to rotate therewith, said torquemeter including an annular torque link having a first set of a plurality of bearing regions for receiving forces azimuthal with respect to the drilling axis from the rotary table whereby torque is transmitted from the rotary table to said torque link and a second set of a plurality of bearing regions displaced azimuthally from said first set for receiving azimuthal forces from the Kelly bushing whereby torque is transmitted from said torque link to the Kelly bushing, each of said bearing regions of at least one of said sets being mechanically isolated from the remainder of said torque link except for bridging beams which beams support said isolated regions and seve as the sole conduits for transfer of mechanical forces from said isolated regions to the remainder of said torque link.

each of said bridging beams having coupled thereto associated strain measuring means responsive to the shear strain caused in the associated beam by the transfer of torque from the rotary table to the Kelly bushing by said torque link, and providing an indication thereof.

said torquemeter including means for transmitting to a stationary control station signals derived from said strain measuring means and indicative of the torque transferred from the rotary table to the Kelly bushing by said torque link.

2. A torquemeter as claimed in claim 1 wherein said torque link has generally flat upper and lower faces, said torque link having cavities with electrical equipment and connections used in effecting operation of said strain measuring means affixed therein, said cavities being arranged so that said electrical equipment is accessible from said upper and lower faces while lying wholly between said upper and lower faces, said apparatus including flat upper and lower covers fitting against said upper and lower faces respectively and removably attached to said torque link at points not in said isolated regions, and sealing means whereby said covers seal off said cavities to prevent entry of dirt associated with drilling operations.

3. A torquemeter as claimed in claim 2 including an antenna for data transmission affixed on said torque link outward from its periphery and within said flat upper and lower faces, said covers extending outward from said torque link to protect said antenna.

4. A torquemeter as claimed in claim 1 or claim 2 wherein each isolated region is supported by two of said bridging beams, the first thereof extending radially inward from the region and the second extending radially outward from the region, said beams being positioned and dimensioned so that they lie between and spaced from said covers, and wherein said strain measuring means comprises a pair of strain gages being affixed to each of said beams on faces facing said covers.

5. A torquemeter as claimed in claim 2 wherein the flat faces of the isolated regions facing the covers are depressed slightly below the level of the flat faces of the remainder of the torque link so that the flat faces of the isolated regions will engage said sealing means but will not transmit mechanical forces to the opposed cover.

6. A torquemeter as claimed in claim 5 wherein said sealing means is an elastomeric sheet.

7. A torquemeter as claimed in claim 2 wherein said torque link is made of aluminum and wherein said covers are made of steel.

8. A torquemeter as claimed in claim 1 wherein said second set of bearing regions includes apertures adapted for receiving pins affixed to the Kelly bushing, and wherein said first set of bearing regions includes pins protruding therefrom for engagement with the rotary table.

9. A torquemeter as claimed in claim 8 wherein said apertures are lined with wear bushings made of harder material than the main structure of said torque link.

10. A torquemeter as claimed in claim 8 wherein the surface of each of said apertures is contoured so that the pin of the Kelly bushing when inserted bears at the medial plane of said torque link.

* * * * *